(12) United States Patent
Huxoll

(10) Patent No.: US 6,606,685 B2
(45) Date of Patent: Aug. 12, 2003

(54) SYSTEM AND METHOD FOR INTERCEPTING FILE SYSTEM WRITES

(75) Inventor: Vernon F. Huxoll, Austin, TX (US)

(73) Assignee: BMC Software, Inc., Houston, TX (US)

( * ) Notice: Subject to any disclaimer, the term of this patent is extended or adjusted under 35 U.S.C. 154(b) by 67 days.

(21) Appl. No.: 10/002,273

(22) Filed: Nov. 15, 2001

(65) Prior Publication Data

US 2003/0093620 A1 May 15, 2003

(51) Int. Cl.$^7$ .............................................. G06F 12/08
(52) U.S. Cl. ........................ 711/118; 711/113; 707/204
(58) Field of Search ................................ 711/113, 118; 707/204

(56) References Cited

U.S. PATENT DOCUMENTS 6,115,741 A * 9/2000 Domenikos et al. ........ 709/217
2001/0037433 A1 * 11/2001 Dempsey et al. ........... 711/141
2003/0018865 A1 * 1/2003 Page .......................... 711/163
2003/0088713 A1 * 5/2003 Mandal et al. .............. 709/328

* cited by examiner

Primary Examiner—Hiep T. Nguyen
(74) Attorney, Agent, or Firm—Wong, Cabello, Lutsch, Rutherford & Brucculeri, L.L.P.

(57) ABSTRACT

A method and system for intercepting file system writes. When intercept processing is enabled, a file write request may be passed to intercept write processing, prior to normal write processing. Intercept write processing may include: identifying the file, copying original file information, modifying the write pointer within the original file information, storing the intercepted write in a cache using the modified write pointer. The intercepted write may be allowed to complete normal processing after the intercepted writes are stored in the cache. The intercepted writes may then be retrieved from the cache (e.g., in first-in-first-out (FIFO) order, or in some other user-specified order).

15 Claims, 4 Drawing Sheets

SYSTEM AND METHOD FOR INTERCEPTING FILE SYSTEM WRITES

BACKGROUND OF THE INVENTION

1. Field of the Invention

The present invention relates to intercept software, and more particularly to a system and method for intercepting file system writes.

2. Description of the Related Art

In database systems, such as the Oracle database, available from Oracle Corporation, typically one or more log files exist for purposes of recording transactions for future use (e.g., recovery). Database transactions are written by the database programs to these log files sequentially, typically with over-write capabilities, such that the most recent set of database transactions are always available within the set of log files. The database administrator must select "archive" logging in order to archive each log file, as it fills up, to auxiliary storage (e.g., a tape); otherwise, when the last log file is reached, and filled up, the first log file is over-written with the next database transaction. Consider an example: a database with six log files (i.e., log file 1, log file 2, log file 3, log file 4, log file 5, and log file 6). When log file 1 fills up, database transactions are written to log file 2; when log file 2 fills up, database transactions are written to log file 3, and so on. Eventually, when log file 6 fills up, database transactions are written to log file 1, thus over-writing the oldest logged database transactions. If the first set of database transactions written to log file 1 are not archived (i.e., written to auxiliary storage), those database transactions are lost and cannot be recovered, should a recovery be determined to be required.

Current database reorganization solutions, particularly online reorganization solutions, typically require processing to determine where the log writer pointer resides within the series of log files. Such processing slows down the online reorganization. It is desirable to eliminate the step of searching for the position of the log writer pointer within the series of log files, thus allowing the online reorganization to complete in less time, and to require fewer system resources than current implementations.

For the foregoing reasons, there is a need for a system and method for intercepting file system writes such that the location of the log writer pointer may be maintained, and online reorganizations may be completed in less time.

SUMMARY OF THE INVENTION

The present invention provides various embodiments of a method and system for intercepting file system writes.

In one embodiment, a software utility (e.g., a first software utility) may register one or more files with an intercept software component technology. Prior to registering the one or more files, initialization processing may occur. Initialization may include clearing or re-setting various values and/or parameters. In the case where the file system writes to be intercepted are writes to a database, initialization may include synchronizing or quiescing the database. The intercept software component technology may be started prior to the one or more files being registered.

After the registering step has been performed, the software utility may issue a start command to the intercept software component technology. The start command may provide the signal to the intercept software component technology to start intercepting file writes for all registered files.

After the start command has been issued, the intercept software component technology may intercept writes to the one or more registered files. When a write request is issued while intercept processing is enabled, the write request may cause the intercepted write data to be placed in a cache (e.g., a memory cache or a disk cache).

The intercepted writes may be allowed to complete normal processing after the intercepted writes are stored in the cache. The intercepted writes may then be retrieved (e.g., by a first software utility, or by a user-specified request) from the cache (e.g., in first-in-first-out (FIFO) order, or in some other user-specified order).

In one embodiment, the process of intercepting writes may include: finding one or more file identifiers (e.g., vnodes) associated with the one or more files; storing a copy of original information related to each file identifier (e.g., vnode operation pointers, write pointers); modifying a write pointer within the original information related to each file identifier; using the modified write pointer to store the intercepted write in a cache (e.g., a memory cache or a disk cache).

In one embodiment, the intercept software component technology may be stopped or terminated, after retrieving the intercepted writes. Termination processing may occur after the intercept software component technology is stopped.

In one embodiment, the intercept software component technology may execute on a first computer system, and the first software utility may execute on a second computer system. The first computer system and the second computer system may communicate over a network (e.g., the Internet).

BRIEF DESCRIPTION OF THE DRAWINGS

A better understanding of the present invention can be obtained when the following detailed description of various embodiments is considered in conjunction with the following drawings, in which.

Figure 1:
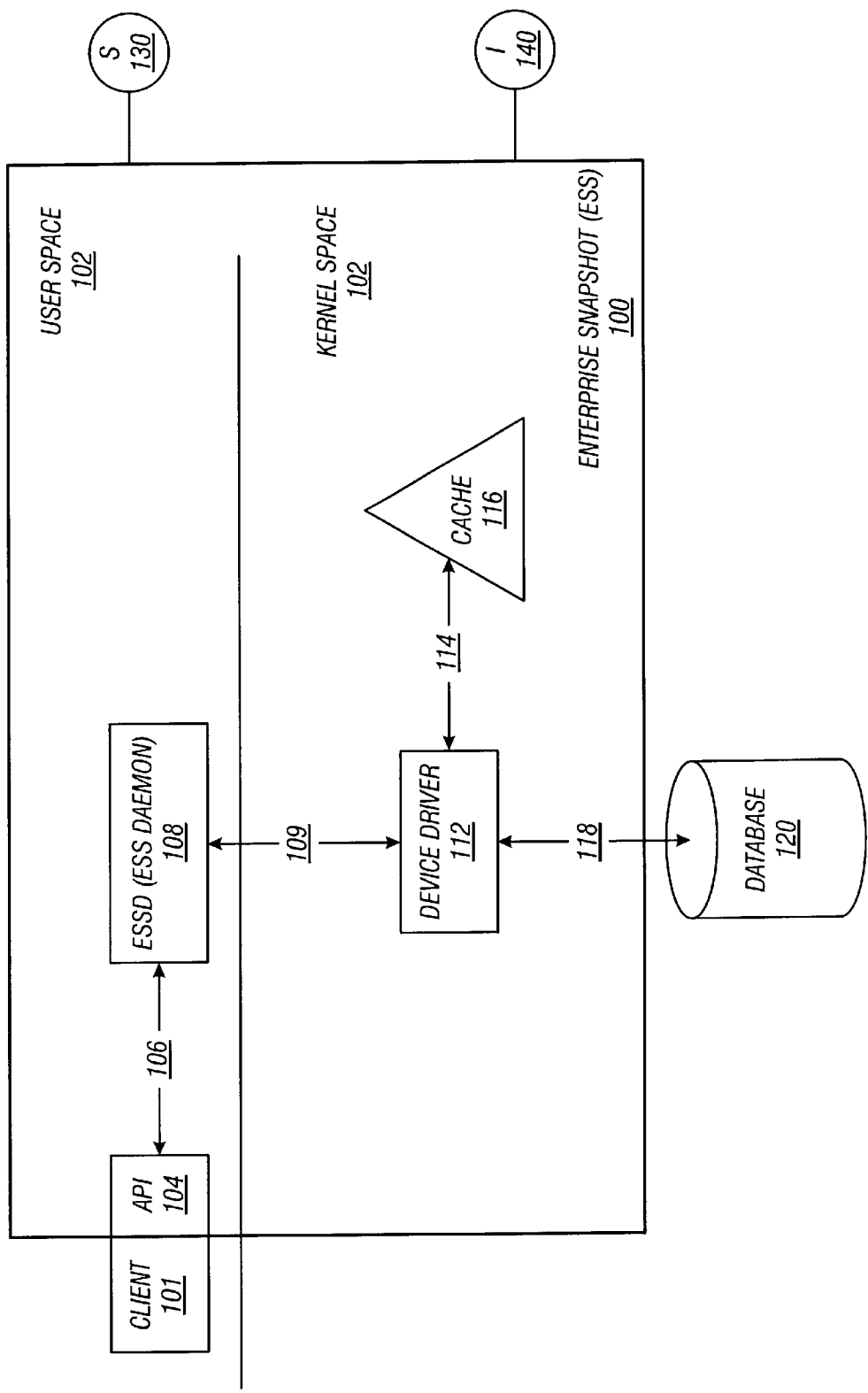
FIG. 1 illustrates a software-based file system intercept, according to one embodiment.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents, and alternatives falling within the spirit and scope of the present invention as defined by the appended claims.

DETAILED DESCRIPTION OF SEVERAL EMBODIMENTS

FIG. 1: A Software-Based File System Intercept

In FIG. 1, an embodiment of a software-based file system intercept is shown. The file system intercept shown in FIG. 1 refers to a file system intercept on UNIX-based systems, for illustration purposes only. File system intercepts for other open or distributed systems (e.g., Microsoft Windows NT) may have slightly different implementations. For example, an ESS (Enterprise Snapshot) daemon (essd) 108, as shown in FIG. 1, may be replaced with an ESS Service for Microsoft Windows NT implementations.

The invention is not intended to be limited to UNIX-based systems as described in FIG. 1, but on the contrary, it is intended to be portable to various open or distributed systems, (e.g., open or distributed systems presently known or developed in the future).

As used herein, an "intercept" is a process of copying a write to any file, file system, or database (e.g., an Oracle database) into a cache, followed by the write completing in a normal manner. In FIG. 1, a software-based Enterprise Snapshot (ESS) is shown utilizing a cache (e.g., a system memory cache or a disk cache) to store data required by any interface utilizing the ESS (e.g., an intercept interface, a snapshot interface, or some other interface). This software-based ESS may require no special hardware or database configuration. ESS is an enabling software technology intended to be used with other utility software programs (e.g., a comprehensive backup software utility, or an online database reorganization utility). ESS may be used with various interfaces (e.g., interface 130 as represented by the letter S, indicating a snapshot interface, interface 140 as represented by the letter I, indicating an intercept interface, among others).

A client 101 may be any software utility program (e.g., a program to reorganize a database, or a program to collect data). The client 101 may communicate with the ESS 100 through a function call to a shared library (not shown). The client 101 may reside on a local host or a remote host, thus allowing for a more transparent distributed usage. It is noted that the ESS daemon (essd) 108 and the ESS 100 are named based on one of the interfaces (i.e., snapshot) for illustration purposes only. The daemon 108 and the system 100 may easily be referred to by any other interface (e.g., intercept) that utilizes their services. Thus, the daemon 108 and the system 100 are not limited to the interface that forms a part of their name. In one embodiment, the daemon 108 may be referred to as an EFI (Enterprise File Intercept) daemon (efid) 108, and the system 100 may be referred to as an EFI 100. Similarly, an EFI daemon 108 and an EFI 100 may service multiple interfaces (e.g., snapshot and intercept, among others).

In one embodiment, the shared library may export a session based Application Programming Interface (API) 104 that may be accessed directly by the client 101. The session based API may give the user more control over locking, tracing, and thread-based storage. Any ESS API call 104 (e.g., essCheck, essGetErrorString, essGetPrimaryError, essGetSecondaryError, essInherit, essInit, essInitIntercept, essInitSnapshot, essIsSnapshotInstalled, essIsSnapshotRunning, essPError, essRead, essRegister, essRestart, essStart, essStop, essTerm) may be passed to the ESS daemon 108. The ESS daemon (essd) 108 may then pass the API request on to a device driver 112, via a communication link 109.

It is noted that a procedural API (as opposed to a distributed object type of interface) may also be used. Any number of clients may concurrently call the procedural API and obtain a session with the ESS daemon. In a single threaded embodiment, ESS may block concurrent access to daemon services. This lack of concurrent access to daemon services may be non-disruptive to client applications, as client requests may be queued and subsequently processed serially.

Communication between the ESS daemon 108 and the client 101 may be achieved through remote procedure calls (RPC), message queues, and/or some other communication method, represented by arrow 106. It is noted that communication methods that allow for asynchronous behavior, may also allow for multi-threaded design to improve performance.

It is noted that the client 101, the API 104, and the ESS daemon 108 may exist in user space 102, in one embodiment. In the software-based ESS shown in FIG. 1, the device driver 112 and a cache 116 may reside in kernel space 110, in one embodiment. The cache 116 may be a system memory cache or a disk cache.

Various interfaces may connect to the ESS 100, either at the user space level or at the kernel space level. These interfaces may be independently deployable. For example, interface 130 is represented by the letter S, indicating a snapshot interface, and interface 140 is represented by the letter I, indicating an intercept interface.

In one embodiment, the device driver 112 may be designed to be portable to various versions of Unix (e.g., HPUX, AIX, and Solaris) and to various file systems (e.g., UFS, JFS, NFS, etc). Typically, some portion of device drivers is platform dependent, by modularizing the elements of the device driver 112, platform dependent modules may be separated from common modules. The device driver 112 may monitor and control input and output (I/O) for each registered file.

In one embodiment, the device driver 112 may adhere to the Device Driver Interface/Device Kernel Interface (DDI/DKI) specification, with the goal of being dynamically loaded, when the operating system allows for dynamic loading of device drivers.

The device driver 112 may be connected to the cache 116 via an Application Programming Interface (API) 114. Similarly, the device driver 112 may be connected to the database 120 via standard file system I/O 118.

Normal write processing (i.e., when intercept processing is not engaged or post-intercept processing) may include writing to a database 120, as shown. However, the destination for the data to be written may just as easily be a single file or a file system or any other data source definable by the user. The client 101 may make a series of API calls to initialize intercept processing. The client 101 may then register files (e.g., files related to database 120) with ESS 100 for intercept processing. The registered files may be logically grouped such that they have the same consistency point. After file registration is complete, the client 101 may direct ESS to start intercept processing.

In the case of a database intercept, the client 101 may require some form of database coordination in order to quiesce or synchronize the database objects before the start of intercept processing. This database coordination may be integrated into the client 101 processing. After a brief outage, the database may be restarted and made available for intercept processing. Database update activity and intercept processing may run concurrently. By allowing the database update activity to run in parallel with intercept processing, data availability may improve. The database outage shrinks to only a small window of time at the beginning of intercept processing. It is noted that a database outage may not be required, in some embodiments.

The data stored in the cache by intercept processing is an image of the writes to the registered files (e.g., database files) from the start of intercept processing. Various applications may find it useful to retrieve this series of first in-first out (FIFO) writes. For example, in the case of a database (e.g., an Oracle database), the FIFO writes may represent database log writes. In one embodiment, a software utility program to reorganize a database may "stream" the FIFO writes (i.e., database log writes) in order to capture the log data at the exact time of the start of a reorganization. One benefit of such a method would be that the conventional step of opening and reading "redo" log files would no longer be required. Thus, the issue of losing data due to the database log writer wrapping around to the beginning of a set of log files and overwriting data (i.e., database log writes) before the data is retrieved by the reorganization software utility program may be eliminated.

In one embodiment, the data may be stored in the cache along with a key and a data length. An example of a key may be an unsigned 64 bytes binary integer, assigned in a sequential order.

Upon the start of the intercept processing, the device driver 112 may set a flag and may commence watching every write to each registered file. When a write to a registered file is detected by the device driver 112, the cache 116 may be used as a location to copy or store the write, prior to allowing normal write processing of the data to take place. At some later time (i.e., after one or more writes are stored in the cache 116), the client 101 may retrieve the data stored in the cache by the intercept process.

In one embodiment, when the ESS system is started, a maximum cache size may be specified by a user. Alternatively, if the user does not set the maximum cache size, a default value for the maximum cache size may be used. The maximum cache size may represent a limit to which the cache may grow. For the case where the cache 116 is a memory cache, memory may be allocated on an as-needed basis, and deallocated when cache storage is no longer needed, in one embodiment. For the case where the cache 116 is a disk cache, disk space may be allocated on an as-needed basis, and deallocated when disk storage is no longer needed, in one embodiment. In addition, writes may be purged from the cache 116 after the client 101 has read them, thus freeing space in the cache 116 for new data. The user may tune and/or configure the ESS cache for purposes of optimizing performance.

ESS may run as a separate process in UNIX-based systems. As a separate process, ESS is independently configurable from the client processes, or any other processes. ESS may be tightly integrated with the client software. This independence/integration paradigm may yield flexibility and ease of operation. ESS may monitor the status of the client process, thus resources allocated by ESS on behalf of the client may be automatically freed if the client fails.

ESS may monitor the operating environment. In the case of the cache being a memory cache, if no client programs are currently utilizing cache storage managed by ESS, the ESS system may automatically free the cache memory. The next time cache storage is required, memory may be reallocated on an as-needed basis.

Figure 2:
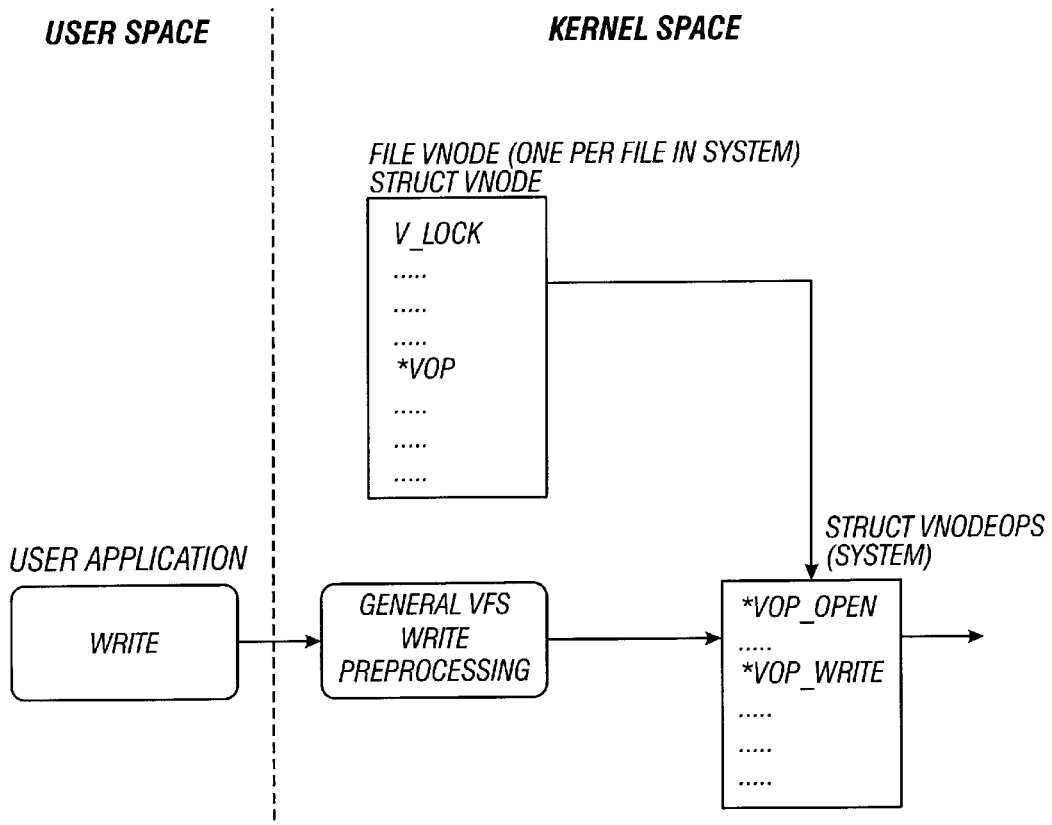
FIG. 2 illustrates a prior art file system write.

FIG. 2: Prior Art File System Write

A prior art file system write process is shown in FIG. 2. A user application may issue a write command within user space. Program control may then be passed from the user application in user space to general virtual file system (VFS) write preprocessing in kernel space. After preprocessing is completed, the program control may then be passed to a system vnodeops structure for completion of the write process (e.g., writing the data block out to a storage device). As shown, each file in the file system may have a vnode structure.

Figure 3:
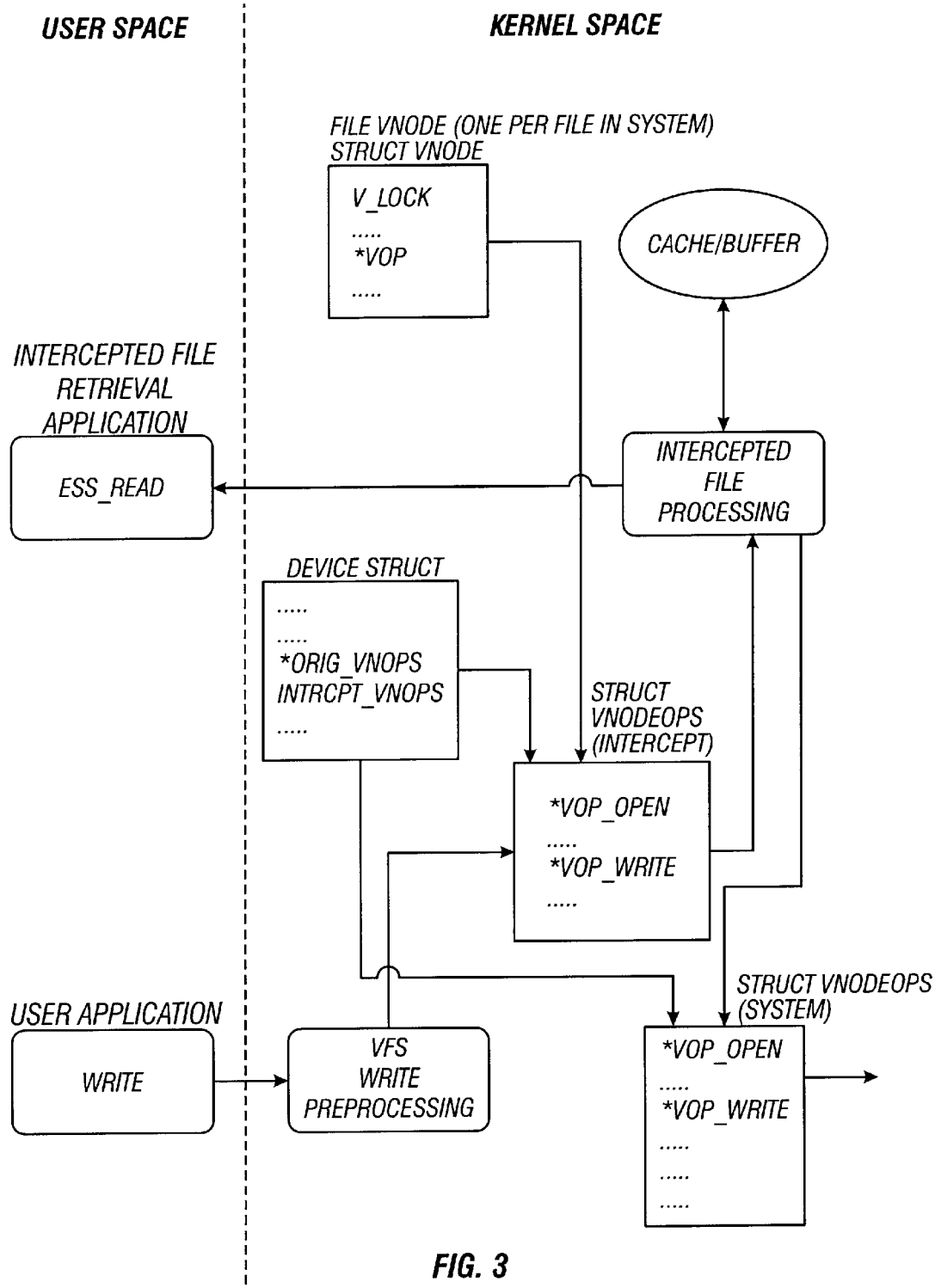
FIG. 3 illustrates an intercepted file system write, according to one embodiment.

FIG. 3: One Embodiment of an Intercepted File System Write

One embodiment of an intercepted file system write process is shown in FIG. 3. Similar to the prior art file system write shown in FIG. 2, the intercepted file system write process may begin with a user application issuing a write command within user space. Program control may then be passed from the user application in user space to general virtual file system (VFS) write preprocessing in kernel space. After preprocessing is completed, the program control may then be passed to an intercept version of a vnodeops structure for intercept processing.

In one embodiment, the intercept version of the vnodeops structure may be similar to the system vnodeops structure, as described in FIG. 2. As detailed later, the system vnodeops structure is also used in FIG. 3, after intercept file processing is completed. The intercept version of the vnodeops structure may store and/or reference pointers to the original vnops (i.e., *orig_vnops) and the intercept vnops (i.e., intrcpt_vnops), among other data and/or pointers (e.g., v_lock, *vop) stored in a structure (e.g., a vnode structure) for each file in a file system. After storage of various elements related to the intercepted file system write, the data may be passed to intercept file processing. Intercept file processing may utilize a cache or buffer to store the intercepted data, for subsequent retrieval upon request from a user. Upon completion of the intercept processing, the data may be passed to the system vnodeops structure for completion of the write process.

A user application may issue a specific read command to retrieve intercepted data (e.g., an ESS_READ command, as shown) within user space. As noted earlier, the data stored in the cache or buffer by intercept processing is an image of the writes to the registered files (e.g., database files) from the start of intercept processing. Various applications may find it useful to retrieve this series of first in-first out (FIFO) writes.

Figure 4:
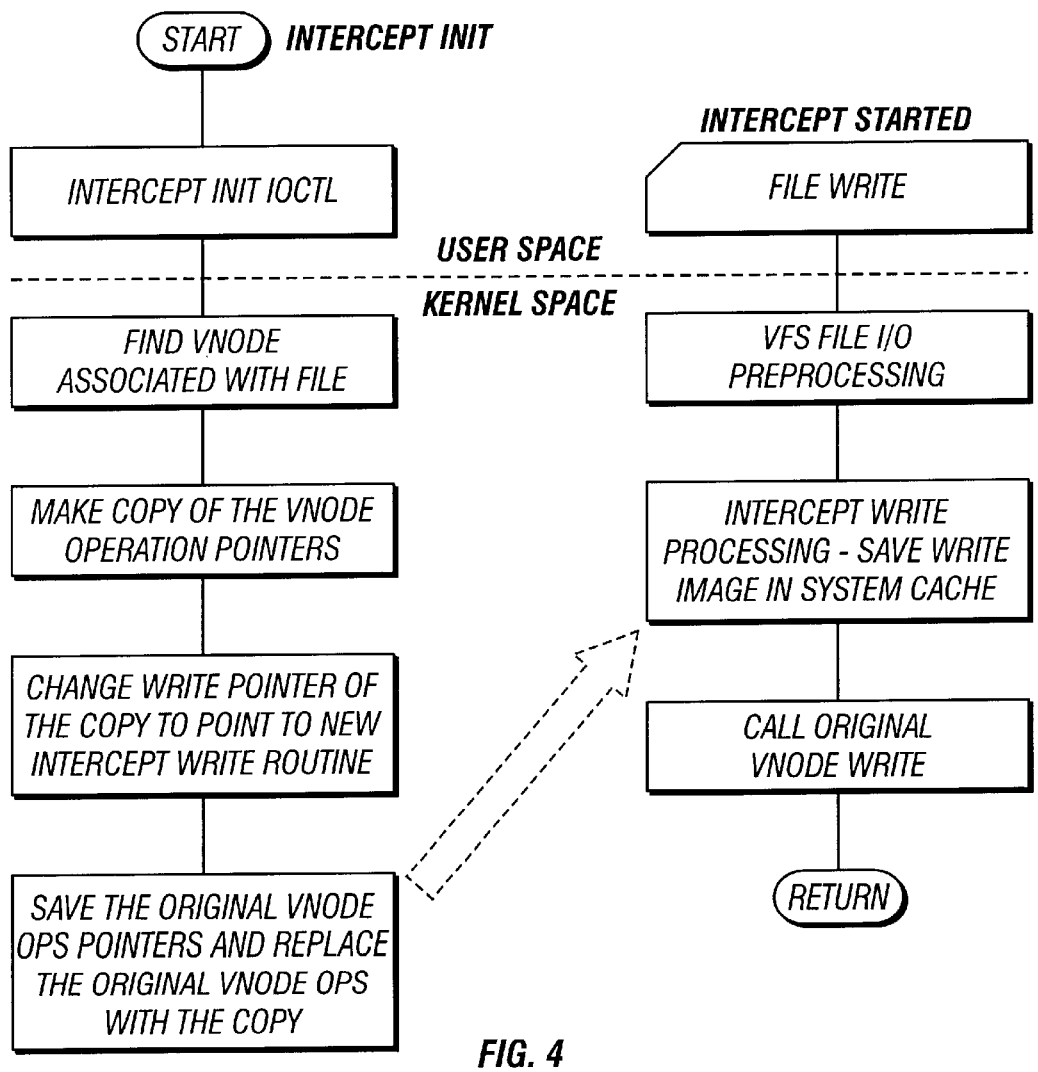
FIG. 4 is a flowchart illustrating an intercepted file system write, according to a second embodiment.

FIG. 4: A Second Embodiment of an Intercepted File System Write

A second embodiment of an intercepted file system write process is shown in FIG. 4 in flowchart form.

As shown, within user space, intercept initialization processing may occur. A file write request issued by a user application within user space may send or pass data to be written from the user application in user space to virtual file system (VFS) write (or input/output, I/O) preprocessing in kernel space. After preprocessing is completed, the data may then be passed to intercept write processing.

When a write request is issued while intercept processing is enabled, each write request may cause a series of actions to take place. For example, one or more file identifiers (e.g., vnodes) associated with the one or more files may be found or identified, followed by a copy of original information related to each file identifier (e.g., vnode operation pointers) being stored. The copy of the original information related to each file identifier may include a write pointer. The write pointer within the original information related to each file identifier may be modified. The intercepted write to the one or more files may be stored in a cache using the modified write pointer. The intercepted write to the one or more files may be allowed to complete normal processing after the intercepted writes are stored in the cache. The intercepted writes to the one or more files may then be retrieved from the cache (e.g., in first-in-first-out (FIFO) order, or in some other user-specified order).

Figure 5:
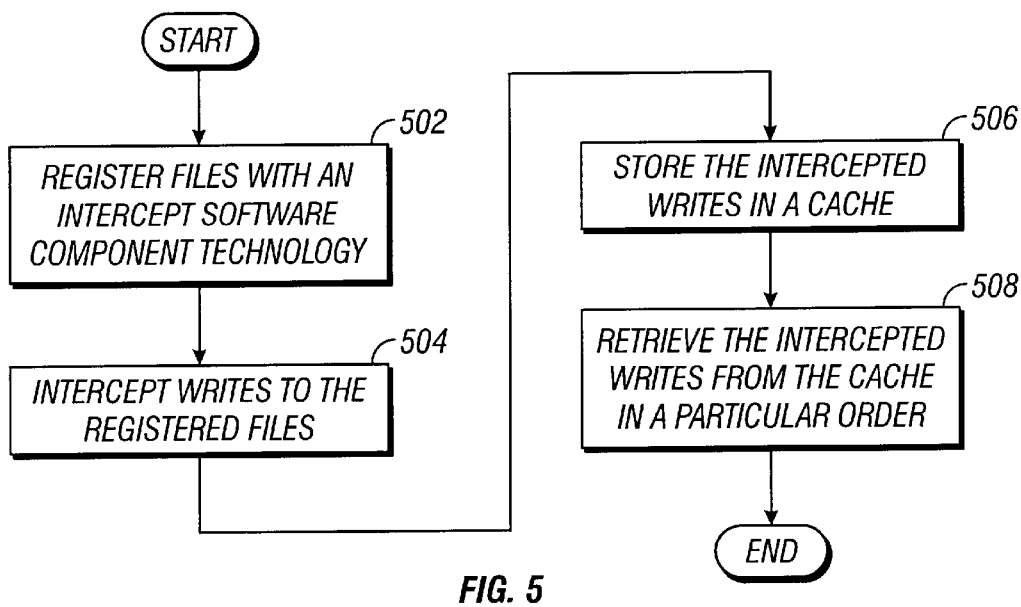
FIG. 5 is a flowchart illustrating a system and method for intercepting file system writes, according to one embodiment.

FIG. 5: Intercepting File System Writes

FIG. 5 is a flowchart illustrating a system and method for intercepting file system writes, according to one embodiment.

As shown in step 502, one or more files may be registered with an intercept software component technology. In one embodiment, a software program (e.g., a first software program) may register the one or more files with the intercept software component technology. In one embodiment, the intercept software component technology may provide services to the first software program. The intercept software component technology may also be encapsulated into the first software program.

Prior to registering the one or more files, initialization processing may occur. Initialization may include clearing or re-setting various values and/or parameters. In the case where the file system writes to be intercepted are writes to a database, initialization may include synchronizing or quiescing the database.

After the initialization step has been performed, the client software utility may call a register function of the intercept software component technology program interface. In one embodiment, the register function may cause the following series of actions to take place: finding one or more file identifiers (e.g., vnodes) associated with the one or more files; storing a copy of original information related to each file identifier (e.g., vnode operation pointers, write pointers); modifying a write pointer within the original information related to each file identifier; using the modified write pointer to gain program control and thus allow the intercept software component technology to store the intercepted write data in a cache (e.g., a memory cache or a disk cache).

After the one or more files are registered with the intercept software component technology, the intercept software component technology may be signaled to start intercepting writes to registered files.

In step 504, writes to the one or more registered files may be intercepted. When a write request is issued while intercept processing is enabled, each write request may cause a series of actions to take place, as detailed in the following steps.

In step 506, the intercepted writes to the one or more registered files may be stored in a cache (e.g., a memory cache or a disk cache). In one embodiment, the intercepted writes to the one or more registered files may be allowed to complete normal processing after the intercepted writes are stored in the cache.

In step 508, the intercepted writes to the one or more registered files may be retrieved from the cache in a particular order (e.g., first in first out, or some other user-specified order). For example, the retrieval may occur via a user-specified request or a second software program, (e.g., an automated software program). In one embodiment, the intercept software component technology may be stopped or terminated, after retrieving the intercepted writes. Termination processing may occur after the intercept software component technology is stopped.

In one embodiment, the first software program may execute on a first computer system, and the second software program may execute on a second computer system. The first computer system and the second computer system may communicate over a network (e.g., the Internet).

The second software program may request or retrieve data from the appropriate cache by determining if the requested data is currently resident in the memory cache or the disk cache.

Although the system and method of the present invention have been described in connection with several embodiments, the invention is not intended to be limited to the specific forms set forth herein, but on the contrary, it is intended to cover such alternatives, modifications, and equivalents as can be reasonably included within the spirit and scope of the invention as defined by the appended claims.

What is claimed is:

1. A method of data storage and retrieval in a computer system, the method comprising:
    registering one or more files with an intercept software component technology, wherein said registering is performed using a first software utility;
    the intercept software component technology intercepting writes to the one or more registered files;
    storing the intercepted writes to the one or more registered files in a cache;
    the first software utility retrieving the intercepted writes to the one or more registered files from the cache in a particular order.

2. The method of claim 1, further comprising:
    the intercepted writes to the one or more registered files completing normal processing, after the intercepted writes are stored in the cache.

3. The method of claim 1, wherein the particular order is first in first out.

4. The method of claim 1, further comprising:
    performing initialization processing prior to registering one or more files with the intercept software component technology, wherein the initialization processing operates to prepare the one or more files for interception;
    stopping the intercept software component technology, after retrieving the intercepted writes;
    performing termination processing, after stopping the intercept software component technology.

5. The method of claim 1, wherein the cache is a memory cache or a disk cache.

6. The method of claim 1, further comprising:
    signaling the intercept software component technology to start intercept processing after one or more files are registered with the intercept software component technology, wherein said signaling is performed using the first software utility.

7. A method of data storage in a first computer system, the method comprising:
    registering one or more files with an intercept software component technology, wherein said registering is performed using a first software utility;
    the intercept software component technology intercepting writes to the one or more registered files;
    storing data from the intercepted writes to the one or more registered files in a cache;
    the intercepted writes to the one or more registered files completing normal processing, after the intercepted writes are stored in the cache;
    the first software utility requesting data from one or more of the intercepted writes to the one or more registered files from the cache.

8. The method of claim 7, wherein the cache is a memory cache or a disk cache.

9. The method of claim 7, further comprising:
    a second computer system;
    the intercept software component technology executing on the first computer system;
    the first software utility executing on the second computer system; and
    wherein the first computer system and the second computer system communicate over a network.

10. The method of claim 9, wherein the network is the Internet.

11. The method of claim 7, wherein the first software utility requesting data from one or more of the intercepted writes to the one or more registered files from the cache comprises:
    retrieving the requested data from the cache.

12. A method of intercepting writes to one or more files in a computer system, the method comprising:

finding one or more file identifiers associated with the one or more files;

storing a copy of original information related to each file identifier wherein the copy of the original information related to each file identifier comprises a write pointer;

modifying the write pointer within the original information related to each file identifier;

storing the intercepted write to the one or more files in a cache using the modified write pointer;

allowing the intercepted write to the one or more files to complete normal processing after the intercepted writes are stored in the cache.

13. The method of claim 12, further comprising:

retrieving the intercepted writes to the one or more files from the cache.

14. The method of claim 12, wherein the one or more file identifiers comprise vnodes.

15. The method of claim 14, wherein the original information related to each file identifier comprises vnode operation pointers.

* * * * *